United States Patent
Bagby et al.

(10) Patent No.: US 10,433,532 B1
(45) Date of Patent: Oct. 8, 2019

(54) DIRECT MOUNT BOW REEL SAFETY INDICATOR

(71) Applicant: W.C. BRADLEY/ZEBCO HOLDINGS, INC., Tulsa, OK (US)

(72) Inventors: Robert D. Bagby, Broken Arrow, OK (US); Joshua M. Denton, Broken Arrow, OK (US); Shane Fetty, Tulsa, OK (US)

(73) Assignee: W.C. BRADLEY/ZEBCO HOLDINGS, INC., Tulsa, OK (US)

( * ) Notice: Subject to any disclaimer, the term of this patent is extended or adjusted under 35 U.S.C. 154(b) by 268 days.

(21) Appl. No.: 15/616,440

(22) Filed: Jun. 7, 2017

(51) Int. Cl.
*A01K 89/01* (2006.01)
*F41B 5/14* (2006.01)
*A01K 81/00* (2006.01)

(52) U.S. Cl.
CPC ...... *A01K 89/0122* (2015.05); *A01K 89/0102* (2013.01); *A01K 89/01087* (2015.05); *F41B 5/1488* (2013.01); *A01K 81/00* (2013.01)

(58) Field of Classification Search
CPC .............. A01K 81/00; A01K 89/01025; A01K 89/0108; A01K 89/08
See application file for complete search history.

(56) References Cited

U.S. PATENT DOCUMENTS

| | | | |
|---|---|---|---|
| 3,949,730 A | 4/1976 | Schoenberger | |
| 4,154,413 A * | 5/1979 | Hull | A01K 89/0102 242/239 |
| D264,988 S | 6/1982 | Finlay | |
| 4,674,471 A * | 6/1987 | Lance | A01K 81/00 124/86 |
| 4,962,747 A * | 10/1990 | Biller | F41B 7/046 124/22 |
| 5,038,510 A | 8/1991 | Duke | |
| 5,236,148 A * | 8/1993 | Valentine | A01K 89/0102 16/DIG. 13 |
| 5,553,413 A | 9/1996 | Gannon | |
| 6,070,822 A * | 6/2000 | Zwayer | A01K 89/0102 242/310 |
| 6,089,484 A | 7/2000 | Zwayer et al. | |
| 6,138,935 A * | 10/2000 | Zwayer | A01K 89/0102 242/238 |
| 6,641,070 B1 * | 11/2003 | Wong | A01K 89/0102 242/311 |
| 8,464,700 B2 | 6/2013 | Smith et al. | |

(Continued)

*Primary Examiner* — Emmanuel M Marcelo
(74) *Attorney, Agent, or Firm* — James F. Lea, III; Gable Gotwals

(57) ABSTRACT

A bow fishing reel for mounting on a bow. The reel provides an indicator for alerting a shooter when the reel is configured to fire safely. A main shaft in a body of the reel is positionable from a rearward winding position to a forward casting position by depressing a thumb button protruding the reel body. A thumb button structure engages with the main shaft for transitioning the main shaft from the rearward winding position to the forward casting position. A visual indicator displays a first indicator when the main shaft and thumb button are in the casting position. The visual indicator may be located on an indicator portion of the thumb button that is visible through an indicator window on a reel upper surface. The visual indicator may include a negative indicator and a positive indicator. A secondary negative indicator may also be provided on the thumb button.

10 Claims, 5 Drawing Sheets

(56) References Cited

U.S. PATENT DOCUMENTS

| | | | |
|---|---|---|---|
| 9,043,999 B1* | 6/2015 | Boester | A01K 89/02 |
| 9,101,119 B2 | 8/2015 | Dunlop et al. | |
| 9,288,973 B1* | 3/2016 | Zwayer | A01K 89/0102 |
| 2011/0005120 A1* | 1/2011 | de Koning | A01K 87/00 43/19 |
| 2011/0240811 A1 | 10/2011 | Soderberg | |
| 2012/0042863 A1 | 2/2012 | Smith et al. | |
| 2012/0285430 A1 | 11/2012 | Dunlop et al. | |
| 2014/0332615 A1* | 11/2014 | Braun | A01K 89/0108 242/236 |
| 2015/0354915 A1* | 12/2015 | Woods, Jr. | F41B 5/1488 124/86 |

* cited by examiner

DIRECT MOUNT BOW REEL SAFETY INDICATOR

FIELD OF THE INVENTION

The invention relates generally to direct mount bow fishing reels. More particularly, the invention relates to bow fishing reels having a safety indicator for alerting a user of safe and unsafe firing conditions.

BACKGROUND OF THE INVENTION

A potential problem associated with typical direct mount reels or bowfishing reels relates to user error when setting up for a shot. If the user forgets to depress the thumb button on the reel to release the line before shooting an arrow, then the arrow may break free of the line, resulting in a lost arrow. Alternatively, the arrow could bounce back at the user, potentially causing serious injury. Therefore, it is desirable to provide a reel wherein mechanisms are provided to alert a user when it is safe to fire.

SUMMARY OF THE INVENTION

The present disclosure relates to a reel for affixing to a bow that facilitates bow fishing. The reel is preferably directly mounted to a compound or recurve bow. The reel is typically attached by threading a bolt into a stabilizer socket that is found on most current bows.

The bow fishing reel has a reel body that defines a thumb button orifice. A main shaft having a first end and a second end is located within the reel body. A spool is mounted on the main shaft proximate to the first end of the main shaft. The main shaft is selectively positionable in one of a rearward winding position or a forward casting position by depressing a thumb button that protrudes through the thumb button orifice.

A visual indicator is provided for displaying a first indicator when the main shaft is in the forward casting position to alert a shooter that the reel is in a safe configuration for firing an arrow, i.e., the reel is in a configuration to allow line to freely payout from the spool.

The thumb button defines an engaging structure for operative engagement with the second end of the main shaft for selectively transitioning the main shaft from the rearward winding position to the forward casting position.

In one embodiment, the mounting end of the reel body defines an upper attachment arm and a lower attachment arm. A rear portion of the reel body defines the thumb button orifice between the upper attachment arm and the lower attachment arm. The upper attachment arm and the lower attachment arm may join to define an attachment end. The upper attachment arm, the attachment end, the lower attachment arm, and the rear portion of the reel body may define an access opening therebetween, wherein the thumb button extends into the access opening of the reel body.

In one embodiment, an upper surface of the reel body defines an indicator window for displaying the visual indicator. The indicator window is located such that a shooter is able to see the indicator window when the shooter is setting up for a shot. In one embodiment, the thumb button includes an indicator portion, wherein the indicator portion is visible through the indicator window. The indicator portion comprises the visible indicator.

In one embodiment, indicator portion includes a negative indicator, e.g., a red reflective surface, that is visible though the indicator window when the thumb button is in the winding position. The indicator portion may also include a positive indicator, e.g., a green reflective surface, that is positioned to be visible through the indicator window when the thumb button is in the casting position.

In one embodiment, a portion of the thumb button that extends through the access opening defines a secondary negative indicator, e.g., a red reflective surface. The secondary negative indicator is visible when the thumb button is in the winding position and is not visible when the thumb button is in the casting position. The secondary negative indicator is visible to the shooter as a shooter is setting up to take a shot.

Therefore, it can be seen that the bow fishing reel is designed to alert a shooter when the reel is in a condition to fire safely by displaying a visual indicator when a main shaft of the reel is in a forward casting position and not displaying the visual indicator when the main shaft of the reel is in a rearward winding position. The shooter selects one of the casting position and the winding position by depressing a thumb receiving surface of a thumb button or by rotating the handle on the reel.

The thumb button defines an engaging structure for operative engagement with the main shaft for selectively transitioning the main shaft from the rearward winding position to the forward casting position.

The visual indicator is displayed through an indicator window, wherein the thumb button further defines an indicator portion, and wherein the visual indicator is on the indicator portion on the thumb button.

When the main shaft is located in the winding position, a negative indicator is displayed through the indicator window, wherein the visual indicator includes the negative indicator.

When the main shaft is located in the casting position, a positive indicator is displayed through the indicator window wherein the visual indicator includes the positive indicator. In one embodiment, a secondary negative indicator is located on a portion of the thumb button that extends through the thumb button orifice for displaying the secondary negative indicator when the main shaft is in the winding position. The secondary negative indicator is not visible when the main shaft is in the casting position because the thumb button is retracted within the thumb button orifice.

DETAILED DESCRIPTION OF THE PREFERRED EMBODIMENTS

Figure 1:
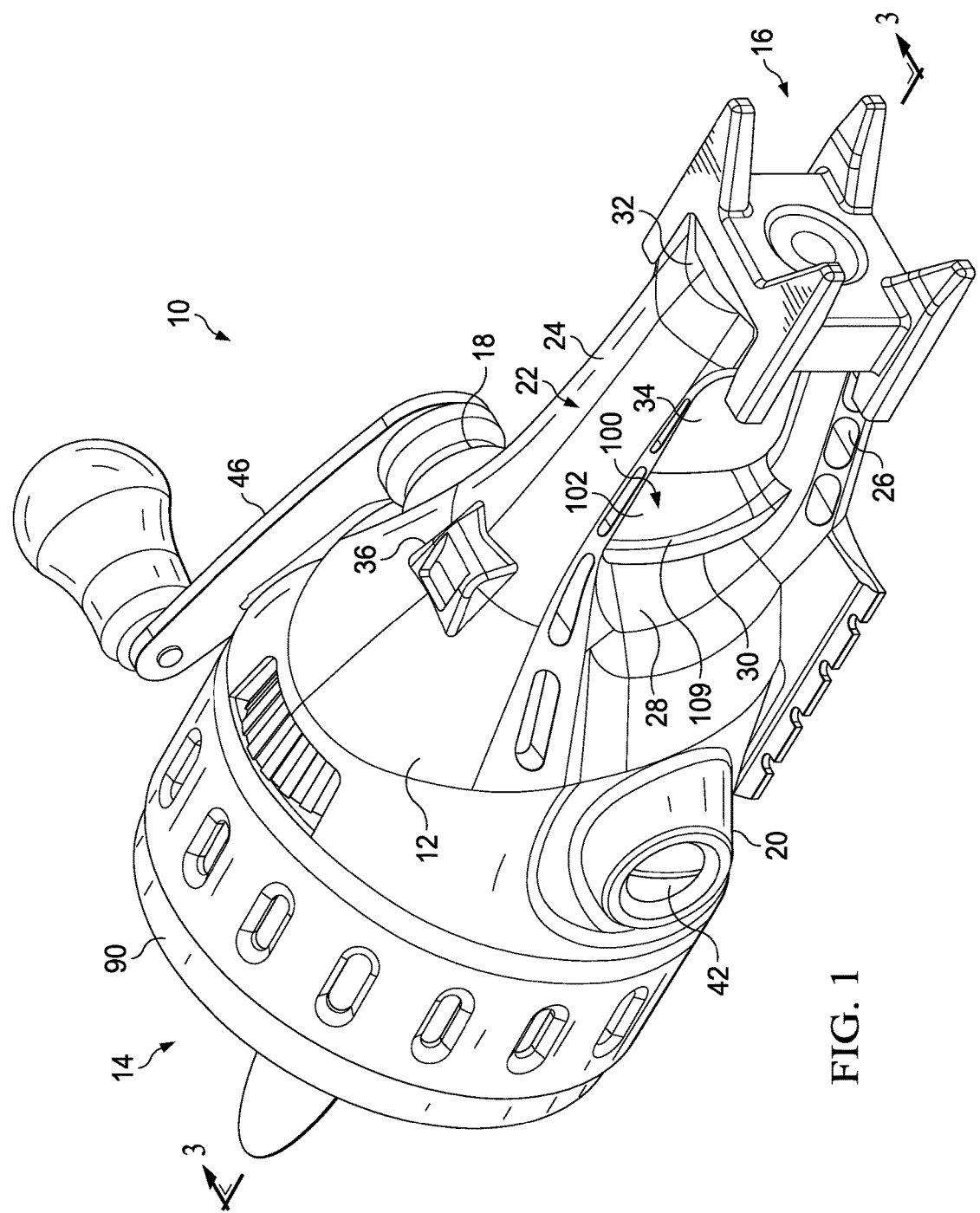
FIG. 1 is a perspective view of a reel for mounting on a bow.
Figure 2:
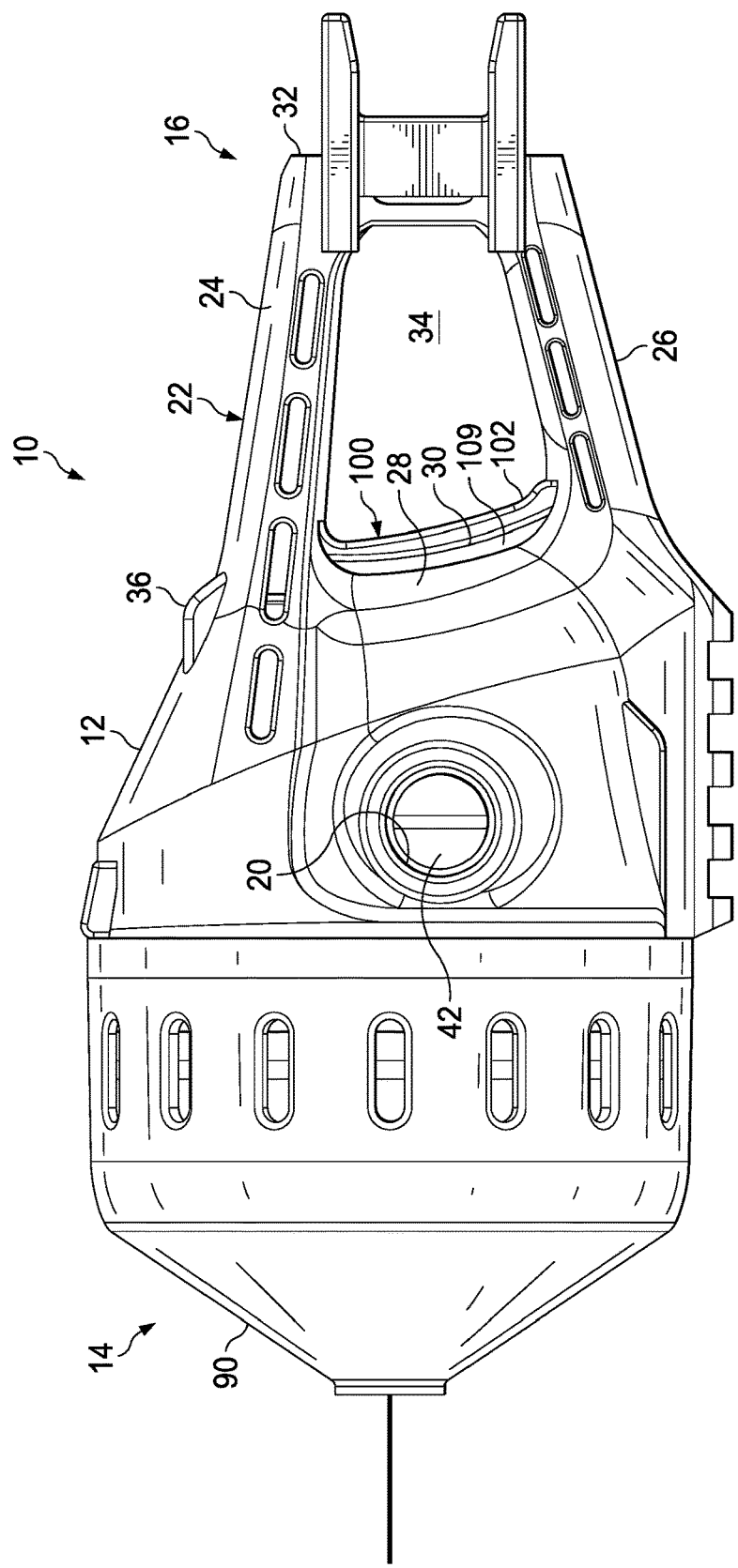
FIG. 2 is an elevation view of the reel of FIG. 1.
Figure 3:
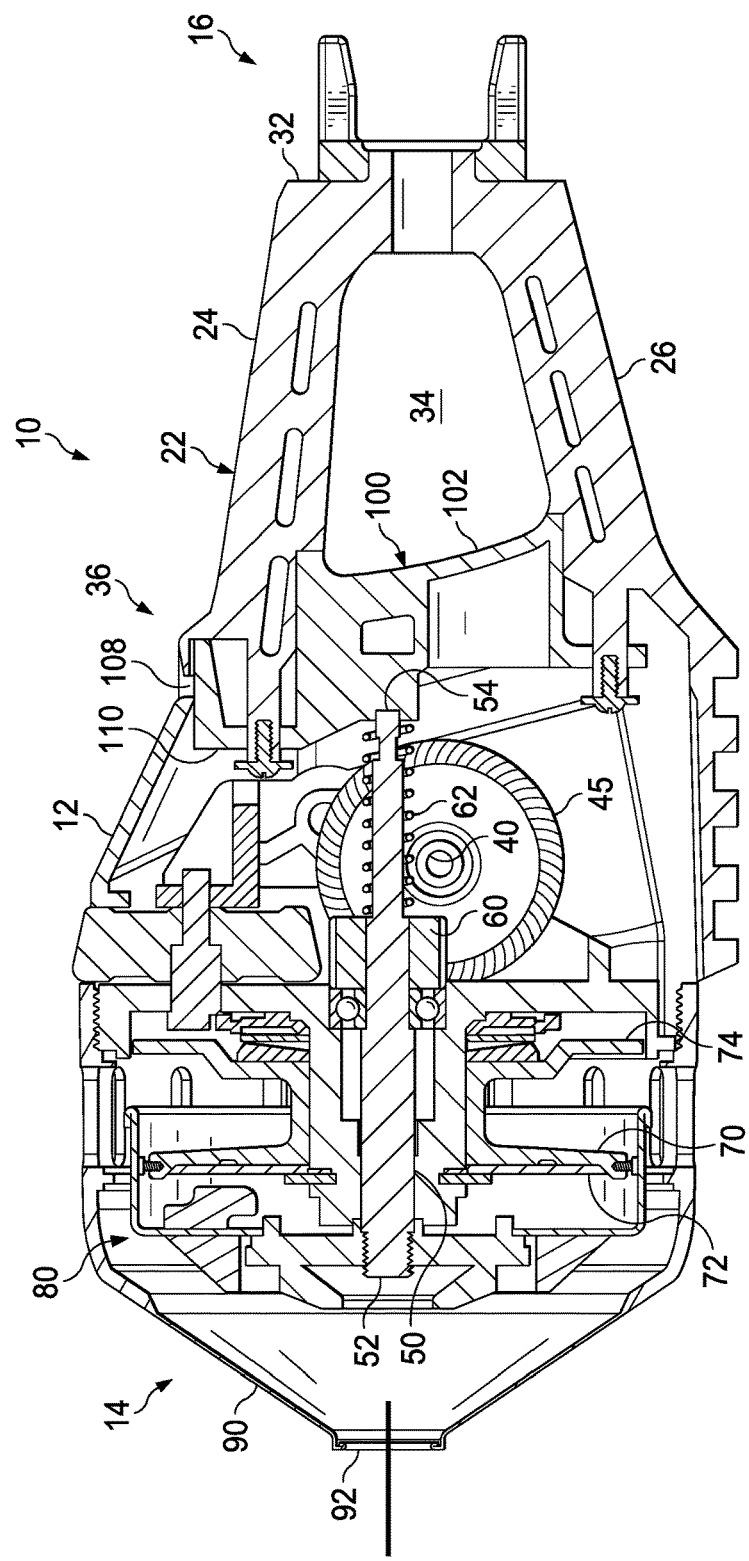
FIG. 3 is a cross-sectional view taken along lines 3-3 of FIG. 1.
Figure 4:
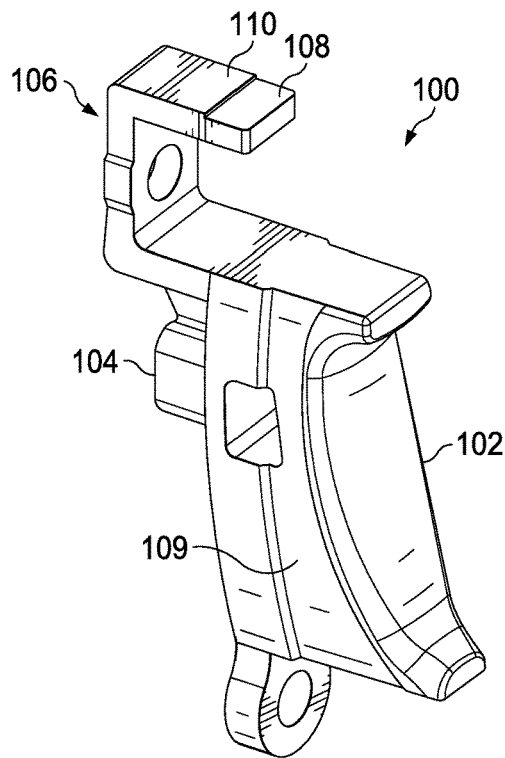
FIG. 4 is a perspective view of a thumb button component of the reel of FIG. 1.
Figure 5:
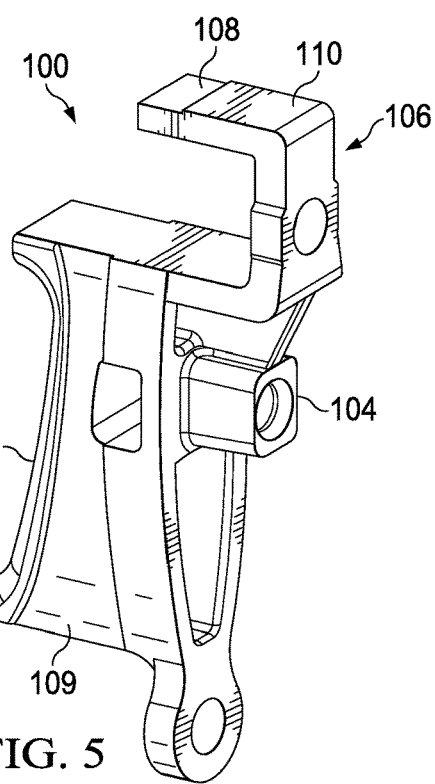
FIG. 5 is a perspective view of the thumb button component of FIG. 4.
Figure 6:
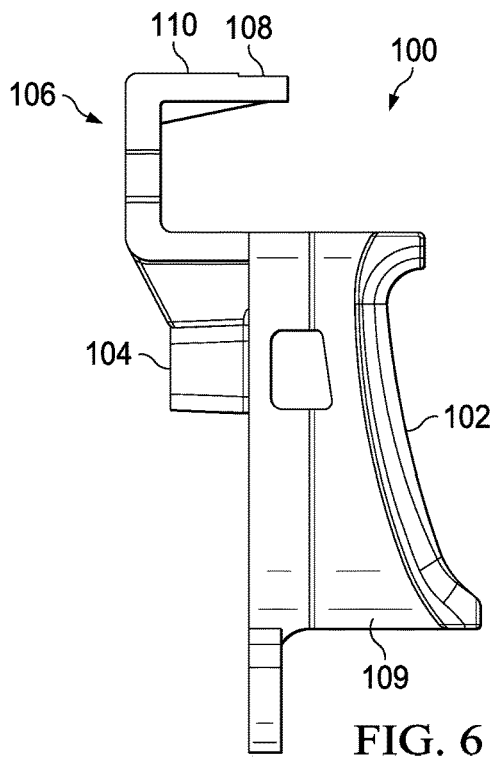
FIG. 6 is a plan view of the thumb button component of FIG. 4.

Referring now to FIGS. 1-3, shown is bow fishing reel 10. Bow fishing reel 10 includes reel body 12. Reel body 12 has spool end 14 and mounting end 16. Reel body 12 defines right crank rod orifice 18 and left crank rod orifice 20.

Mounting end 16 defines upper attachment arm 22 that defines upper surface 24. Mounting end 16 additionally includes lower attachment arm 26. Reel body 12 further includes rear portion 28 that defines thumb button orifice 30 between upper attachment arm 22 and lower attachment arm 26.

Upper attachment arm 22 and lower attachment arm 26 connect to attachment end 32. Rear portion 28 of reel body 12 defines access opening 34 therebetween. Upper surface 24 of upper attachment arm 22 defines indicator window 36.

Crank rod 40 is received in one of right crank rod orifice 18 and left crank rod orifice 20. Crank rod 40 has head end 42 and attachment end. Drive gear 45 (FIG. 3) is located on crank rod 40. Handle 46 (FIG. 1) is affixed to the attachment end of crank rod 40.

Referring now primarily to FIG. 3, main shaft 50 has first end 52 and second end 54. First end 52 extends from spool end 14 of reel body 12. Main shaft 50 is selectively positioned in either a casting position or a winding position.

Pinion gear 60 is located on main shaft 50. Pinion gear 60 is keyed on main shaft 50 such that main shaft 50 can slide longitudinally through pinion gear 60 but cannot rotate independently of pinion gear 60. Thus, regardless of the longitudinal position of main shaft 50, shaft 50 can be rotated by turning crank handle 46. Pinion gear 60 is positioned for engagement with drive gear 45 when main shaft 50 is in a winding position. Pinion gear 60 is positioned for disengagement with drive gear 45 when main shaft 50 is in a casting position, thereby facilitating selective engagement between main shaft 50 and drive gear 45. Main shaft spring 62 is provided on main shaft 50 for biasing main shaft 50 rearwardly to the winding position.

Still referring primarily to FIG. 3, spool 70 is mounted on main shaft 50 proximate to first end 52 of main shaft 50. Spool 70 has first side 72 and second side 74.

Spinner head assembly 80 is affixed to first end 52 of main shaft 50 adjacent to first side 72 of spool 70. Spinner head assembly 80 includes a line-grasping mechanism, such as a pick-up pin mechanism, located in an interior of spinner head assembly 80.

Front cover 90 is affixed to spool end 14 of reel body 12. Front cover assembly 90 defines line orifice 92. Front cover 90 encloses spool 70 and spinner head assembly 80.

Thumb button 100 is received in thumb button orifice 30. Thumb button 100 extends through access opening 34 of reel body 12. Thumb button 100 defines thumb receiving surface 102 that is located within access opening 34 of reel body 12. Thumb button 100 defines engaging structure 104 for interfacing with second end 54 of main shaft 50. Engaging structure 104 is provided for selectively transitioning main shaft 50 from the winding position to the casting position.

Referring now to FIGS. 3-6, thumb button 100 additionally includes indicator portion 106. Indicator portion 106 is positioned to be visible through indicator window 36. Indicator portion 106 is provided with negative indicator 108 at a rearward end of indicator portion 106. Negative indicator 108 is positioned to be visible through indicator window 36 when thumb button 100 is in an extended position, which is indicative of main shaft 50 being positioned in a rearward position, i.e., in the winding position.

A secondary negative indicator 109 may be provided on a side surface of thumb button 100. Secondary negative indicator 109 does not cover thumb receiving surface 102 or any portion of thumb button 100 that is visible when thumb button 100 is in a depressed or casting position. At least a portion of secondary negative indicator surface extends from thumb button orifice 30 and is visible when thumb button 100 is in an extended or winding position. In one embodiment, negative indicator 108 and secondary negative indicator 109 are a reflective red sticker.

Indicator portion 106 is additionally provided with positive indicator 110 that is positioned forward of negative indicator 108. Positive indicator 110 is positioned to be visible through indicator window 36 when thumb button 100 is in a depressed position, which is indicative of main shaft 50 being positioned in a forward position, i.e., in the casting position. In one embodiment, positive indicator 110 is a green reflective sticker.

Figure 7:
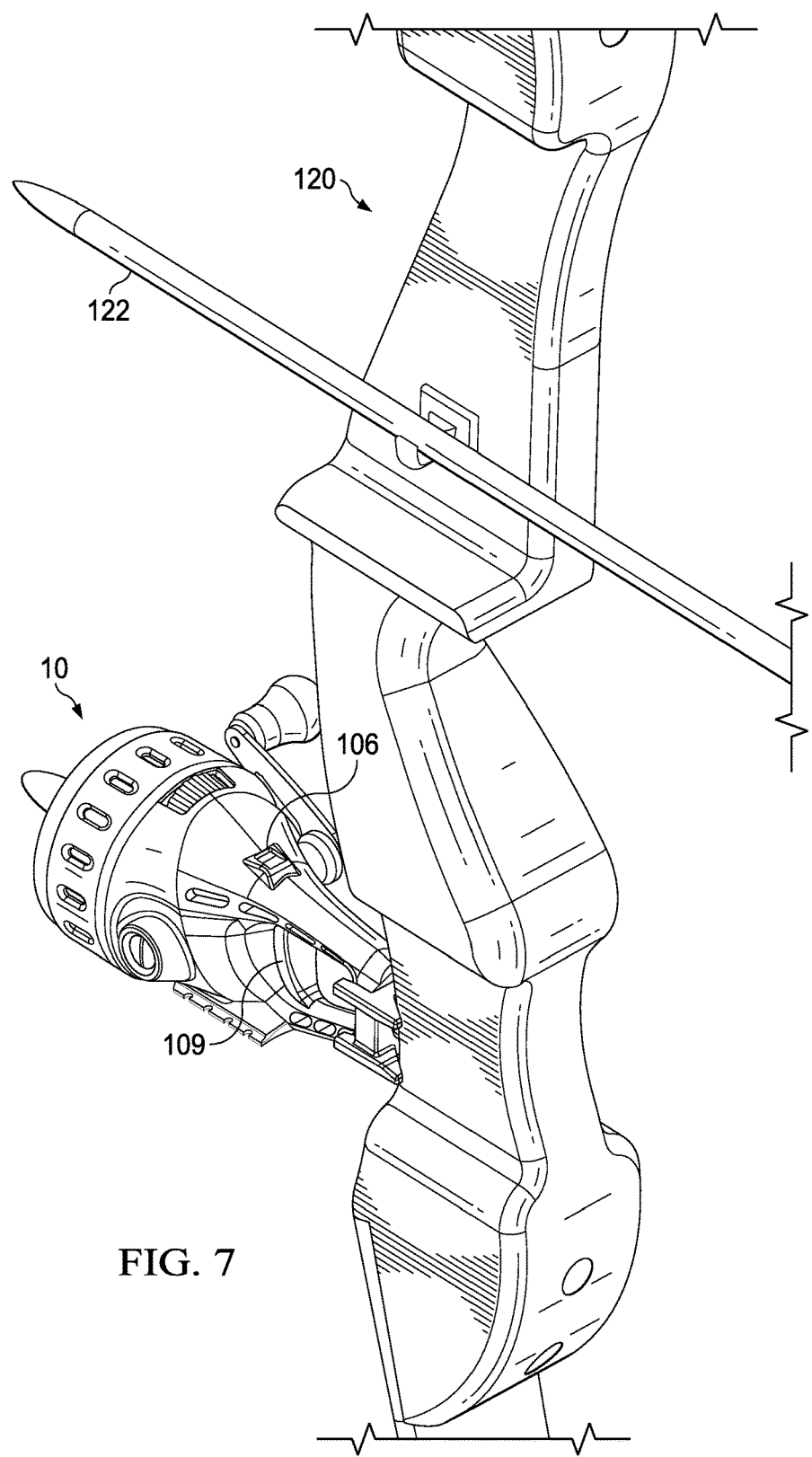
FIG. 7 is a perspective view of the reel of FIG. 1 affixed to a bow.

Referring to FIG. 7, shown is a perspective view of reel 10 affixed to bow 120. It can be seen that when arrow 122 is nocked, from the perspective of a shooter. As can be seen in FIG. 7, when a shooter is preparing to fire, indicator portion 106 and secondary negative indicator 109 (if applicable) will be visible to the shooter.

When preparing to fire arrow 122, which is connected to line wound around spool 70 of reel 10, a user initially presses and holds thumb button 100, whereby main shaft 50 and spinnerhead assembly 80 move forward. After moving forward, spinnerhead assembly 80 clamps line against an inside of a tapered forward wall of front cover 90. When the user releases thumb button 100, spring 62 moves main shaft 50 and spinnerhead assembly 80 rearwardly such that the line is no longer clamped against front cover 90. The line is then available to flow freely over the forward end of line spool 70 and through orifice 92 that is provided in front cover 90 once an arrow is released.

Line is able to flow freely through orifice 92 after the user presses thumb button 100 to begin the casting motion because main shaft 50 carries spinnerhead assembly 80 and the line-grasping mechanism forward and the grasping pins are retracted within spinner head assembly 80. When the user then releases thumb button 100 at the end of the casting motion, shaft spring 62 urges main shaft 50, spinnerhead assembly 80, and the line-grasping mechanisms rearwardly such that the grasping pins are retained a in retracted position. Spinnerhead assembly 80 and grasping pins thus do not interfere with the flow (i.e., payout) of the line over the forward end of spool 70.

When the user desires to set and/or retrieve (i.e., wind) the fishing line, the user turns crank handle 46. The turning of crank handle 46 imparts rotational movement to main shaft 50 and to the line-grasping mechanism. Spinnerhead assembly 80 and line-grasping mechanisms are moved fully rearward. When the line grasping mechanism is positioned fully rearward, the grasping pins are returned in a fully projecting position and will operate to grasp the line and wrap the line around spool 70 upon turning of crank handle 46.

Therefore, it can be appreciated that if a user neglects to press thumb button 100, prior to firing an arrow, the grasping pins will prevent the line from freely paying out from spool 70, potentially resulting in line breakage or arrow bounce back. Applicant's negative indicator 108 and positive indicator 110 are visible through window 36 defined by upper surface 24 of upper arm 22. Therefore, when a user looks down an arrow for aiming at a target, the indicators 108, 110 will be visible, thereby alerting the user whether it is safe to fire a shot.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A bow fishing reel comprising:
   a reel body defining a thumb button orifice;
   a main shaft having a first end and a second end, said main shaft located within said reel body, said main shaft is selectively positionable in one of a forward casting position or a rearward winding position;
   a visual indicator for displaying a first indicator when said main shaft is in said forward casting position;
   a thumb button received in said thumb button orifice, said thumb button defining an engaging structure for operative engagement with said second end of said main shaft for selectively transitioning said main shaft from said rearward winding position to said forward casting position;
   said reel body having a spool end and a mounting end, said mounting end defining an upper attachment arm having an upper surface, said mounting end defining a lower attachment arm, said reel body defining a rear portion that defines said thumb button orifice between said upper attachment arm and said lower attachment arm, said upper attachment arm and said lower attachment arm defining an attachment end, said upper attachment arm, said attachment end, said lower attachment arm, and said rear portion of said reel body defining an access opening therebetween; and
   wherein said thumb button extends through said thumb button orifice and into said access opening of said reel body.

2. The bow fishing reel according to claim 1 wherein:
   a portion of said thumb button extending through said thumb button orifice defines a secondary negative indicator;
   said secondary negative indicator is visible when said thumb button is in said winding position and is not visible when said thumb button is in said casting position.

3. A bow fishing reel comprising:
   a reel body defining a thumb button orifice;
   a main shaft having a first end and a second end, said main shaft located within said reel body, said main shaft is selectively positionable in one of a forward casting position or a rearward winding position;
   a visual indicator for displaying a first indicator when said main shaft is in said forward casting position;
   a thumb button received in said thumb button orifice, said thumb button defining an engaging structure for operative engagement with said second end of said main shaft for selectively transitioning said main shaft from said rearward winding position to said forward casting position;
   said reel body defines an indicator window for displaying said visual indicator.

4. The bow fishing reel according to claim 3 wherein:
   said thumb button further comprising an indicator portion, wherein said indicator portion is visible through said indicator window; wherein said indicator portion comprises said visible indicator.

5. The bow fishing reel according to claim 4 wherein:
   said indicator portion includes a negative indicator that is visible though said indicator window when said thumb button is in said winding position.

6. The bow fishing reel according to claim 4 wherein:
   said indicator portion includes a positive indicator that is positioned to be visible through said indicator window when said thumb button is in said casting position.

7. A method of alerting a shooter of a bow fishing reel when the reel is in a condition to fire safely, comprising:
   displaying a visual indicator when a main shaft of the reel is in a forward casting position and not displaying said visual indicator when said main shaft of said reel is in a rearward winding position;
   selecting one of said casting position and said winding position, wherein said a thumb button is in a retracted position in said casting position and is in an extended position in said winding position, said thumb button defining an engaging structure for operative engagement with said main shaft for selectively transitioning said main shaft from said rearward winding position to said forward casting position;
   displaying said visual indicator through an indicator window, wherein said thumb button further defines an indicator portion, and wherein said visual indicator is on said indicator portion on said thumb button.

8. The method according to claim 7 further comprising:
   locating said main shaft in said winding position;
   displaying a negative indicator through said indicator window, wherein said visual indicator includes said negative indicator.

9. The method according to claim 7 further comprising:
   locating said main shaft in said casting position:
   displaying a positive indicator through said indicator window wherein said visual indicator includes said positive indicator.

10. A method of alerting a shooter of a bow fishing reel when the reel is in a condition to fire safely, comprising:
    displaying a visual indicator when a main shaft of the reel is in a forward casting position and not displaying said visual indicator when said main shaft of said reel is in a rearward winding position;
    selecting one of said casting position and said winding position, wherein a thumb button is in a retracted position in said casting position and is in an extended position in said winding position, said thumb button defining an engaging structure for operative engagement with said main shaft for selectively transitioning said main shaft from said rearward winding position to said forward casting position;
    extending a portion of said thumb button through an access opening for displaying a secondary negative indicator on said portion of said thumb button;
    wherein said secondary negative indicator is visible when said main shaft is in said winding position and is not visible when said main shaft is in said casting position.

* * * * *